United States Patent
Krebsbach et al.

(10) Patent No.: US 8,870,636 B2
(45) Date of Patent: Oct. 28, 2014

(54) MOBILE SLAUGHTERING AND MEAT PROCESSING METHOD AND SYSTEM

(76) Inventors: Laura Krebsbach, Ulysses, NE (US); Jim Knopik, Belgrade, NE (US); Lori Fischer, Shelby, NE (US); Jerry Eisenmenger, Columbus, NE (US); Diane Schroeder, Ulysses, NE (US); Michael Callicrate, St. Francis, KS (US)

( * ) Notice: Subject to any disclaimer, the term of this patent is extended or adjusted under 35 U.S.C. 154(b) by 375 days.

(21) Appl. No.: 13/428,290

(22) Filed: Mar. 23, 2012

(65) Prior Publication Data
US 2013/0072099 A1 Mar. 21, 2013

Related U.S. Application Data

(60) Provisional application No. 61/466,771, filed on Mar. 23, 2011.

(51) Int. Cl.
*A22B 5/02* (2006.01)
*A22B 7/00* (2006.01)

(52) U.S. Cl.
CPC .......... *A22B 7/001* (2013.01); *A22B 7/008* (2013.01); *A22B 7/00* (2013.01)
USPC .......................................................... 452/53

(58) Field of Classification Search
CPC ............ A22B 5/06; A22B 3/00; A22B 3/005; A22B 3/086; A22B 5/00; A22B 7/00; A22B 5/007; A22B 1/00; A22B 5/0082; A22B 5/161; A22B 5/0029; A22B 5/0064; A22B 5/202; A22B 5/0041; A22B 5/201

USPC .................................................... 452/52, 53
See application file for complete search history.

(56) References Cited

U.S. PATENT DOCUMENTS

| | | | |
|---|---|---|---|
| 4,261,329 A | | 4/1981 | Walsh et al. |
| 4,323,033 A | * | 4/1982 | Vosyka et al. ............ 119/14.04 |
| 4,337,549 A | * | 7/1982 | Anderson et al. ............ 452/173 |
| 4,852,216 A | | 8/1989 | Clayton et al. |
| 5,538,466 A | * | 7/1996 | Sandstrom ..................... 452/52 |
| 5,667,829 A | | 9/1997 | Herlig |
| 5,824,243 A | | 10/1998 | Contreras |
| 5,958,756 A | * | 9/1999 | Reynell ........................ 435/262 |
| 5,969,501 A | | 10/1999 | Glidden et al. |
| 6,027,654 A | | 2/2000 | Pappa et al. |
| 6,041,242 A | | 3/2000 | Coulthard |
| 6,231,769 B1 | | 5/2001 | Pean et al. |
| 6,396,239 B1 | | 5/2002 | Benn et al. |
| 6,669,838 B1 | | 12/2003 | Baarman |
| 6,896,607 B2 | | 5/2005 | Potter et al. |
| 7,022,005 B2 | | 4/2006 | Potter et al. |
| 7,134,957 B2 | | 11/2006 | Clayton et al. |
| 7,163,451 B1 | * | 1/2007 | Poitras ............................ 452/52 |
| 7,234,421 B2 | * | 6/2007 | Natividade et al. ........... 119/720 |
| 7,364,503 B2 | | 4/2008 | Bell et al. |

(Continued)

*Primary Examiner* — Richard Price, Jr.
(74) *Attorney, Agent, or Firm* — Sheridan Ross P.C.

(57) ABSTRACT

A mobile meat processing system and method of use is provided. The mobile system of abattoir contemplates various features and methods for producing various meat and meat products, enables the processing of meat at locations that are desirably close to the source, and further includes features for ensuring safety and cleanliness of the operations to be performed. Water purification and filtration systems are provided for both inlet and waste water, such that the system is adapted to function in connection with a wide variety of water sources.

20 Claims, 7 Drawing Sheets

(56) References Cited

U.S. PATENT DOCUMENTS

| | | |
|---|---|---|
| 7,388,348 B2 | 6/2008 | Mattichak |
| 7,527,730 B2 | 5/2009 | Johannsson et al. |
| 7,713,426 B2 | 5/2010 | Newcombe |
| 7,795,837 B1 | 9/2010 | Haun et al. |
| 7,892,076 B2 | 2/2011 | Mirtsching et al. |
| 8,012,002 B2 | 9/2011 | Brown |
| 8,572,864 B2 * | 11/2013 | Wieck et al. .............. 34/381 |
| 2007/0249275 A1 | 10/2007 | Bell |
| 2009/0026842 A1 | 1/2009 | Hunter et al. |
| 2009/0079161 A1 | 3/2009 | Muchow et al. |
| 2009/0288698 A1 | 11/2009 | Chen |
| 2010/0232148 A1 | 9/2010 | Sharpley et al. |
| 2010/0317270 A1 * | 12/2010 | Jorgensen .............. 452/52 |

\* cited by examiner

MOBILE SLAUGHTERING AND MEAT PROCESSING METHOD AND SYSTEM

CROSS-REFERENCE TO RELATED APPLICATIONS

This application claims the benefit of priority from U.S. Provisional Patent Application No. 61/466,771, filed Mar. 23, 2011, the entire disclosure of which is hereby incorporated by reference in its entirety.

FIELD OF THE INVENTION

The present invention relates generally to methods and devices for a mobile abattoir or meat processing facility. More specifically, the present invention relates to a slaughtering and meat processing system having one or more mobile components such that steps may be performed at a variety of different physical locations.

BACKGROUND

In the processing of animals destined for human consumption, producers usually need to transport their animals to a containment building where an auctioneer sells the animals to brokers and/or meat processors who then transport the animals to abattoirs. Such methods generally require transport of animals over significant distances, increasing costs and reducing the quality of the end-product. Furthermore, during transportation, the animal is generally placed in a confined area and not properly nourished. Being confined in closed quarters, the animals are often in contact with one another, resulting in bruising of the skin of the animal and discoloration on the carcass after the animal has been processed in a slaughter house. When the animals are delivered to the slaughter house, they arrive stressed and are further subjected to a stressful environment, factors which have been known to affect the quality of the meat.

There are currently a number of very large-scale animal suppliers operating slaughter houses and selling meat in very large quantities to meat distributors and large retailers. The presence of these large-scale entities makes it very difficult for the small animal producer to compete in the marketplace, as there are myriad intermediates between the small animal producer and the retailer, resulting in a situation whereby small producers are not profitable operations and are often discouraged from continuing such business.

Another problem that exists with small suppliers is that when their cattle or animals are sent to auction, the animals are usually grouped with those of other producers. Therefore, a producer's specific animals cannot be inspected by that producer, nor is a specific carcass identified by the retailer to give credit to the supplier for the quality of his product. The traceability of the cut meat products derived from his carcasses do not identify the animal supplier but often the broker. The identity of the producer, a characteristic that may be of particular value to consumers, is often not known to the retailer.

Prior art devices directed at meat processing operations fail to disclose or provide means for addressing various restrictions and regulations imposed by the United States Department of Agriculture and the Department of Public Health. Prior art devices consequently fail to provide truly mobile processing facilities. For example, prior art trailers are designed to be parked on gravel or concrete pads sloped with drain fields and do not provide for means for obtaining or purifying water, thus relying solely on a limited volume of a predetermined water tank/source.

U.S. Pat. No. 7,163,451 to Poitras, which is hereby incorporated by reference in its entirety, discloses a regional abattoir with mobile unit and method of use. Reference is also made to U.S. Pat. No. 5,538,466 to Sandstrom, which describes the construction of a mobile abattoir. Sandstrom fails to disclose various novel features of the present invention including, for example, features for water purification at an upstream and/or downstream portion(s) of meat processing operations.

SUMMARY OF THE INVENTION

Accordingly, the present invention contemplates a novel system, device, and methods for mobile meat processing and animal slaughtering wherein water purification processes, methods, and/or procedures are performed. In various embodiments, a mobile abattoir system is provided comprising the ability to utilize or access predetermined or preexisting water sources. Accordingly, preexisting water sources, such as local well water or municipal water supplies may be accessed and utilized in compliance with various USDA and Department of Public Health requirements.

A feature of the present invention is to provide a mobile abattoir unit comprising a water filtration and/or purification unit for purification of source water. Water from a variety of sources, such as preexisting aquifers and ground wells may be utilized and the water contained therein incorporated into various additional processes. In one embodiment, a water filtration unit comprises a holding tank, conveyance means for conveying/transmitting water, and one or filter means, such as multimedia filters, for example.

In various embodiments, a mobile abattoir system is provided with an ozone water purification system to filter and/or purify source water in order to meet or exceed various standards for food-contact regulations and to eliminate water quality as a variable in plant sitting. Utilizing water from a certified system eliminates or reduces the risk that an otherwise sanitary process is compromised by tapping into a local water source as is often necessary in mobile operations. Water treatment systems of the present invention reduce or eliminate the risks of public health concerns for various slaughtering and related operations.

U.S. Pat. No. 6,231,769 to Pean et al., which is hereby incorporated by reference in its entirety, discloses an installation for producing ozonized water comprising a water inlet, an ozone-injection inlet for injecting ozone taken from an ozone source, a contactor for bringing the ozone into contact with the water, a section for utilizing the ozonized water arranged downstream of the contactor, and an undissolved ozone collector downstream of the contactor comprising an outlet connected to the circuit for producing ozonized water upstream of the contactor. Various features as described in Pean may be incorporated within embodiments of the present invention.

U.S. Pat. No. 5,824,243 to Contreras, which is hereby incorporated by reference in its entirety, relates to a water ozonating system. Contreras discloses ozonated water further being kept within a closed system until being dispensed to a user. Contreras and similar devices may be incorporated into various embodiments and operations of the present invention.

U.S. Pat. No. 5,667,829 to Herlig relates to a process and apparatus for treating meat products with ultrasonic energy in an ozonated water environment to eradicate harmful pathogens from the surface of the meat products. Herlig, which is hereby incorporated by reference in its entirety, and various features disclosed therein may be implemented in embodiments of the present invention, particularly with respect to rinse/fresh water operations.

U.S. Pat. No. 6,027,654 to Pappa et al., U.S. Pat. No. 7,527,730 to Johannsson et al., U.S. Pat. No. 7,713,426 to Newcombe, and U.S Pat. No. 6,669,838 to Baarman, which are hereby incorporated by reference in their entireties, disclose various methods for filtering water. Devices and methods as disclosed in these references may be implemented within various embodiments of the present invention for purifying both inlet/fresh water and waste/contaminated water.

In one embodiment, a semi-stationary trailer is provided on a concrete pad with a water treatment system being employed to purify and filter water from a local pre-existing water source in a manner that will render the water certifiably safe in accordance with, for example, USDA, FDA and 3A material and design standards.

In various embodiments, one or more water filtration system comprising ozone features is provided for use with waste water and/or fresh water. In one embodiment, water for use in meat rinsing processes is subjected to ozone disinfection. In this form, the ozone disinfection in the rinse water is a back up to the (normal) acid wash that provides added anti-pathogen protection to ensure the safety of source water. Accordingly, in at least one embodiment, the mobility of a mobile abattoir is further enhanced based upon this provision of a fresh water purification system which enables the abattoir to advantageously use any number of local sources of water. Thus, increased mobility is provided over known devices which need to connect to an approved or certified body of water and/or comprise their own on-board volume of clean safe water.

In various embodiments, ozone and filtration wastewater treatment systems are provided for treatment of waste or downstream water in order to assist with compliance of various environmental regulations for waste-water discharge. Where local regulations allow discharge at the slaughter site, the water quality in the discharge subjected to treatment according to the invention will pose no harm or threat to the environment. If discharge into a city water treatment system is required, the waste water discharged will have the added benefit of pre-treating the effluent to minimize its effects on the civic system.

In one embodiment, a waste water filtration unit is provided, the waste water filtration unit comprising ozone means for subjecting a volume of water to ozone. Ozone means include, but are not limited to ozone recirculation devices such as an ozone generator(s) and an oxygen concentrator(s).

A waste water system of the present invention comprises a grinder pump for processing and conveying animal products to a tank comprising water subjected to recirculating ozone. In one embodiment, waste water from the tank is further subjected to one or more filtration elements or filters. In a preferred embodiment, ozonated waste water is subjected to three multimedia filter elements and/or filters comprising iron-manganese before being discharged from a mobile abattoir. Waste water may be discharged from an abattoir by pumping or displacing the waste water to a collection facility or tank, or may be pumped to a wide variety of end destinations as will be apparent to one of ordinary skill in the art.

The present invention further contemplates a fresh water filtration unit. In various embodiments, an oxygen generator is provided to feed the ozone generator. In one embodiment, a water storage tank is provided for accumulating and housing fresh ozonated water. Water storage tanks suitable for use in the present invention range from approximately 50 gallons to 1,500 gallons. In a preferred embodiment, a water storage tank is provided having a volume approximately between 500 and 1,000 gallons. In a more preferred embodiment, a water storage tank is provided comprising a volume approximately between 600 and 700 gallons.

The World Health Organization has recognized that an Oxidation Reduction Potential ("ORP") of approximately 650 mV will disinfect and destroy viruses in water in a near instantaneous fashion. In one embodiment, fresh and/or waste water for use in the present invention comprises an ORP of at least 600 mV. In a preferred embodiment, fresh and/or waste water for use in the present invention comprises an ORP of approximately 650 mV to approximately 1200 mV. In a more preferred embodiment, fresh and/or waste water for use in the present invention comprises an ORP of approximately 900 mV.

In various embodiments, the present invention comprises a mobile abattoir unit having one or more catalytic ozone destructors, ozone generators, and/or oxygen concentrators, one or more pumps, and/or various known valves for directing or regulating water flow. Filtration units may be provided to cleanse or filter water from an outside source for use in meat processing operations, and/or be employed to cleanse and filter water prior to dumping or disposal.

Catalytic ozone destructors, such as the commercially available FaradayOzone DES-OZ-01, may be provided in various embodiments of the present invention. Providing water with ozone is known to destroy algae, viruses, bacteria, and fungi on contact and break down harmful chemicals into simpler less damaging molecules. In various embodiments, pre-existing trailers, such as refrigerated trailers are provided for use in connection with mobile abattoir units of the present invention. Utilizing such pre-existing trailers offer the ability to significantly reduce costs of the trailer, in some cases by approximately 85%, and the system generally. Particularly where pre-existing trailers comprise trailer with refrigeration features, the existence of a refrigeration unit and ducting further reduce costs as the mobile abattoir, in various embodiments, requires the same or similar equipment. Furthermore, utilizing pre-existing trailers reduces the load on the generator and solved various power issues that occur from running two refrigeration units at the same time.

In various embodiments, employing pre-existing or used trailers that previously hauled hanging halves and that were provided with reinforced roofs, sides, floors, and sides, as well as with stainless steel and plastic to meet USDA standards, significantly reduces costs and construction of mobile abattoir units.

In further embodiments, pre-existing trailers with overhead tracks for conveying various carcasses are utilized to further reduce costs and provide increased functionality of the mobile abattoir unit.

It will be expressly understood that the present invention is not limited to the use of any particular trailer unit. However, in various embodiments, a mobile abattoir system is provided wherein a pre-existing trailer unit is selected and modified, enhanced, or cannibalized to obtain various advantages including, but not limited to reducing the costs of construction and functionality of the mobile abattoir system.

The utilization of pre-existing trailers in accordance with the present invention, while providing benefits of reduced costs, also provides for complications with respect to achieving the desired sizing and layout of both internal and external features of the trailers. For example, certain pre-existing trailers are known to be sized so as to reduce the number of competing trailer products and associated contents which may be compatible with docking stations.

In various embodiments, trailers of the present invention comprise pre-existing or used trailer units which have been modified with reinforced roofing structures. Such trailers are reinforced so as to be able to accommodate the weight of any number or combination of animals including, but not limited to bovine, equine, porcine, ovine, and/or poultry products. Where standard trailers are generally only adapted to house product placed upon a floor of the trailer, the present invention contemplates modifying such units so as to support and/or transport various weights from a ceiling location as well.

In one embodiment, a mobile abattoir of the present invention comprises one or more winches which may be used to manipulate or relocate livestock (e.g. via lifting and dragging motions). These winches or similar devices may further be used to remove the hide from various animals. Therefore, in one embodiment, one or more winches are provided within a mobile abattoir for pulling, as opposed to skinning a hide from an animal. Such a device provides increased value to a carcass and increases overall efficiency of the system. As it is known that many hide pulling devices (see, e.g., the DBH_100 down stroke beef hide puller provided by CTS Limited) are known to be large suited for permanent processing plants and impractical or impossible to operate within relatively small mobile abattoir units, the provision of winches according to at least one embodiment of the present invention provides a novel and efficient means for removing hides from animals in a mobile abattoir setting.

In one embodiment, pre-existing trailers are modified for use in mobile abattoir units such that a lower or bottom portion of the trailer is lowered in order to increase the internal working height of the abattoir unit and related areas. Such a reduction in the floor or bottom height of the trailer further enables a reduction in the slope of the entry ramp, thereby facilitating ingress and egress of animals and other objects to and from the trailer.

U.S. Patent Application Publication No. 2007/0287370 to Mirtsching et al., which is hereby incorporated by reference in its entirety, discloses a method and apparatus for the differential and purposeful stimulation of an animal carcass. Various features and methods disclosed in Mirtsching may be incorporated into embodiments of the present invention including, but not limited to electrically stimulating the muscles of an animal carcass in order to increase tenderness of the meat.

U.S. Pat. No. 6,896,607 to Potter et al., U.S. Pat. No 7,022,005 to Potter et al., and U.S. Pat. No. 7,134,957 to Clayton et al., which are hereby incorporated by reference in their entireties, disclose methods and systems for dehairing an animal, providing a system for recycling and safely disposing of waste produced during the dehairing. Various methods and features disclosed by these references may be implemented in combination with various novel mobile features of the present invention in one or more embodiments.

In various embodiments, the present invention comprises features for capturing and/or utilizing solar energy to assist in various processes. It will be recognized that various physical locations in which it is desirable to perform mobile abattoir functions, source of electric power may be scarce. Thus, while the present invention contemplates the use of various petroleum based generator devices, solar power may additionally be utilized in combination with or in lieu of more conventional power generation means. For example, U.S. Patent Application Publication No. 2010/0232148 to Sharpley et al., which is hereby incorporated by reference in its entirety, discloses a portable solar light tower. Various components and features as shown and described in Sharpley may be incorporated within various embodiments of the present invention.

U.S. Pat. No. 7,795,837 to Haun et al., which is hereby incorporated by reference in its entirety, discloses a portable solar power supply trailer with a plurality of power interfaces for access by a user external to the enclosure, a plurality of batteries, a solar controller, a power interface timer and two posts for supporting the array. Various components and features from Haun may be implemented within embodiments of the present invention to provide electrical power in mobile abattoir processes. It is contemplated, for example, that a quantity of solar/photovoltaic cells may be disposed on a generally external portion of a mobile abattoir unit to provide electrical energy for any number of meat processing activities and/or activities related thereto.

U.S. Pat. No. 7,388,348 to Mattichak, U.S. Pat. No. 6,396,239 to Benn et al., U.S. Pat. No. 6,041,242 to Coulthard, U.S. pat. No. 5,969,501 to Glidden et al., and U.S. pat. No. 4,261,329 to Walsh et al., and U.S. Patent Application Publication Nos. 2009/0288698 to Chen, 2009/0079161 to Muchow et al., 2008/0026842 to Hunter et al., which further relate to and describe portable solar power systems are hereby incorporated by reference in their entireties.

U.S. Patent Application No. 2009/0079161 to Muchow et al. describes a trailer unit comprising the ability to produce electrical energy from solar and/or wind power. It is contemplated that such features including, but not limited to, deployable wind power features are included within various embodiments of the present invention to increase the functionality and portability of a mobile abattoir unit and create a more versatile and efficient system which may be operated in a wide array of physical locations.

U.S. Pat. No. 8,012,002 to Brown discloses an animal cleaning system and is hereby incorporated by reference in its entirety. Similarly, U.S. Pat. No. 4,852,216 to Clayton, et al. provides an animal slaughtering chemical treatment and method and is also hereby incorporated by reference in its entirety. Safe handling and processing of meat is a critical goal and feature of the present disclosure. Various known methods and features, such as those disclosed in Brown and Clayton, may be provided in mobile units of the present disclosure. In a preferred embodiment, organic hide cleaning solutions, systems, and features are provided to reduce environmental impact.

In various embodiments, a plurality of mobile units are provided and selectively interconnected. Connected or adjacent units, in one embodiment, comprise cold room curtains such as hanging PVC curtains for increasing thermal efficiency of the system without unduly restricting the ingress and egress of user and/or animals. Such curtains or "strip doors" may comprise various dimensions and arrangements. In one embodiment, a strip door of approximately 7 to 10 feet in height is provided, the strips comprising 0.06 gage, 6" smooth strips.

In various embodiments, a method of processing meat within a mobile abattoir system is provided. A known impediment to mobile meat processing is that convenient and/or available water sources may not be suitable for use with meat processing operations. Accordingly, in one embodiment, a method is provided wherein a physical location is selected and a mobile abattoir system is placed at or near the physical location. Prior to or after positioning, a source of water associated with said physical location is located or identified and various tests and/or analyses are performed to determine whether the source of water is acceptable for use with processing meat. Tests and/or analyses of the present invention may comprise any number of known tests or methods for determining whether the water is safe/desirable for use. For example, various characteristics may be analyzed with respect to known thresholds or predetermined values. Such characteristics include, but are not limited to salinity, pH, electrical conductivity, heavy metal content, chlorine content, and pathogen content, to name a few.

Based upon the results of the tests and/or analyses, water may be used and/or processed as necessary. Where needed or desired, water is subjected to a treatment system comprising a water storage unit and ozone means for subjecting one or more sources of water to ozone.

In one embodiment, a method of processing meat within a mobile abattoir system is provided, the method comprising selecting a physical location, positioning at least portions of the mobile abattoir system at the physical location, locating a source of water associated with the physical location, determining whether the source of water associated with the physical location is acceptable for use with processing meat, the determining step based on a characteristic of the source of water not exceeding a predetermined value, wherein the characteristic is selected from the group consisting of salinity, pH, electrical conductivity, heavy metal content, chlorine content, and pathogen content. Based on at least one the characteristic of the source of water not exceeding the predetermined value, a quantity of water from the source of water is utilized for processing meat, and based on the at least one of the characteristic of the source of water exceeding the predetermined value, subjecting a predetermined quantity of water from the source of water to a water treatment system comprising a water storage unit and ozone means for subjecting one or more sources of water to ozone.

Various embodiments of the present disclosure provide for a novel and improved flow of animals for slaughters and meat processing operations. Novel features, devices, and methods as disclosed herein allow the farmer or rancher to maximize value of livestock and recover more money from raised animals. Such features include, but are not limited to, lowered trailers allowing for easier handling of carcasses and animals at various stages of meat processing, trailer layouts which allow carcasses to move through the process faster than previous or known methods of in-field slaughter, a three-phase power to the system from external sources as opposed to power being provided exclusively by internal generators, use of one or more reefer units to cool carcasses and create a redundancy at the most critical part of the slaughter operation, keeping carcasses cool and significantly reducing risk of spoilage. Redundant power systems are thus provided to eliminate or reduce the risk of carcass spoilage due to equipment failure, a potentially significant concern in many rural areas. For example, if a reefer unit fails, a generator can be used to provide cooling power to the carcasses. In the event that both the reefer unit and the generator are both are inoperable, external 3-phase power can be used to run all the operations.

Various embodiments of the present disclosure further contemplate the use of large industrial saws for carcass processing, creating faster line speed and easier use for the butcher.

The present disclosure further contemplates the use of ozone water purification, allowing for on-location use of non-potable water that would otherwise have to be hauled to the slaughter site, often at remote or inconvenient locations. Additionally a pump-grinder disposed in or proximal to the floor of the unit for ease of handling of waste material. At least a portion of the floor of a kill trailer and/or mobile meat processing unit is provided with a grate, to allow blood, fluids, and non-solids to pass through. One or more collection points may be further provided below the grate so as to consolidate and collect materials.

These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described in detail below. Further, the summary of the invention is neither intended nor should it be construed as being representative of the full extent and scope of the present invention. The present invention is set forth in various levels of detail in the summary of the invention, as well as, in the attached drawings and the detailed description of the invention and no limitation as to the scope of the present invention is intended to either the inclusion or non-inclusion of elements, components, etc. in this summary of the invention. Additional aspects of the present invention will become more readily apparent from the detailed description, particularly when taken together with the drawings.

In one embodiment of the present invention, a system for deriving meat products from animals includes an animal guide that consists of a plurality of interconnected corral sections with an entry region for receiving animals and an exit portion comprising a single file chute. Animals are guided through the corral sections and a single animal is directed through the single file chute, and is lead into a first mobile structure comprising an enclosure that has a knocking station for causing the animal to go brain dead in the most humane manner possible. After the animal is knocked, the animal is then inverted in a fashion such that it hangs from one or more of its leg portions downwardly, such that bleeding of the animal can be accomplished. In one embodiment of the invention, the bleeding station is included within the first mobile structure. In other embodiments, however, the bleeding station is in yet a separate mobile structure associated with the first mobile structure, with the first mobile structure and the bleeding station mobile structure being selectively associated with each other such that a conveyance system can connection the first mobile structure and the bleeding station structure via an overhead conveyor traversing both the first mobile structure and the killing station structure. Indeed, one aspect of the present invention involves the ability to specifically configure an overhead conveyor structure across several mobile structures that can be associated with each other to form a coextensive structure that can be reversibly disconnected such that each mobile structure can be associated and towed independently. The ability to mix and match different mobile structures together, however, provides the flexibility of an individual rancher and/or slaughtering process engineer to address the particular needs of a slaughtering facility. For example, in a preferred embodiment, at least four separate mobile structures are intra-related with each other to form a coextensive structure, connected in its uppermost interior ceiling portion with a conveyor system such that carcasses can be conveyed and traversed across and in between the various mobile structures. Each separate mobile structure is preferably confined to a particular function of an overall slaughtering system such that a killing station is separated from an exsanguination station which is separated from a dehiding station, which is separated from an evisceration station, which is separated from a primal meat section station, which is separated from an electrical stimulation section, and which is also separated from a refrigerated and/or freezing section.

With respect to electrical stimulation of a carcass in order to tenderize various portions of the meat thereof, incorporated by reference herein is U.S. Patent Publication No. 2007/0249275 to Bell; U.S. Pat. No. 7,892,076 to Mirtsching et al. and U.S. Pat. No. 7,364,503 to Bell et al.

DETAILED DESCRIPTION

Figure 1:
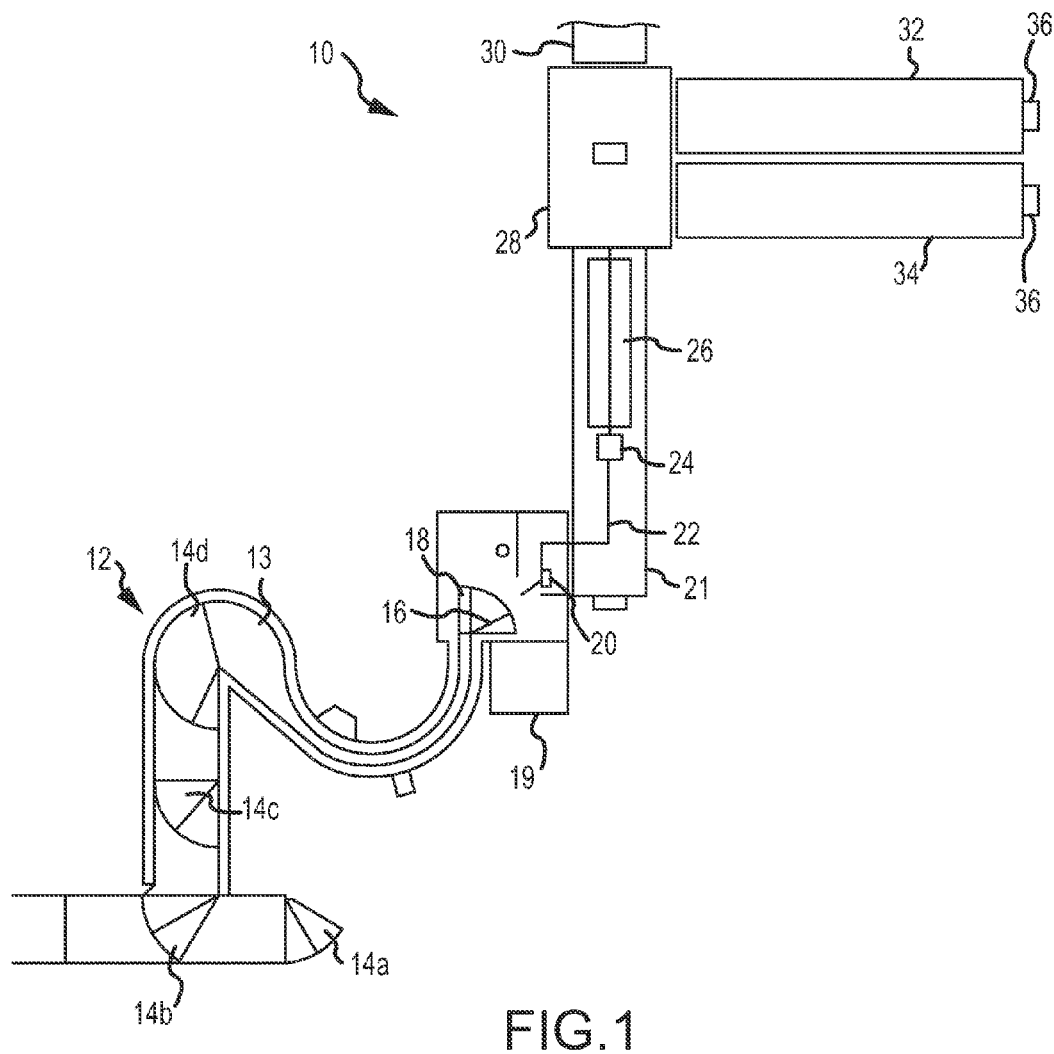
FIG. 1 is a schematic of a mobile slaughtering and meat processing system according to one embodiment.

Referring now to FIGS. 1-7, a mobile abattoir system and various features thereof according to various embodiments of the present disclosure are shown. It should be understood that the drawings are not necessarily to scale. In certain instances, details that are not necessary for an understanding of the invention or that render other details difficult to perceive may have been omitted from these drawings. It should be understood, of course, that the invention is not limited to the particular embodiments illustrated in the drawings.

FIG. 1 is a top plan view of a modular mobile abattoir facility according to one embodiment. As shown, a "kill and chill" facility 10 is provided from a cattle or entrance alley through carcass cooling and/or transportation features. The embodiment illustrated in FIG. 1 is capable of processing at least approximately fifty animals per day in a humane and sanitary manner. As shown, a cattle handling and conveying system 12 is provided, the conveying system comprising a chute or channel with a plurality of gates 14a, 14b, 14c, 14d for controlling the ingress and flow of animals. A crowd pen 13 is provided, the crowd pen extending into a single file chute leading to a head gate 16 and an adjustable kill box 18. Provided proximal to the kill box 18 is a hide cooling and salting area 19, the hide cooling and salting area 19 comprising a dock height of between 40 and 60 inches, and preferably of approximately 52 inches.

Once animals are killed in the kill box 18, they are hung and conveyed along line 22 for various processes such as bleeding, drying, cutting or splitting, and various meat processing operations. For example, a hide puller 20 is provided at in initial portion of the line 22. The hide puller 20 may comprise various hide pullers as used for removing cattle and animal hides as will be recognized by one of skill in the art. Subsequent to hide pulling, carcasses are conveyed along line 22, into a "slaughter trailer" 21. In at least one embodiment, slaughter trailer 21 comprises a 53 foot trailer structure that is specially adapted to house meat processing operations as shown and described herein. In preferred embodiments, the trailer 21 comprises one or more conventional features of trailers, such as mobile or towing features provided by wheels and systems for connection to a vehicle.

Carcasses are conveyed along line 22, split, and washed in a provided carcass wash box 24. In various embodiments, carcass cutting is conducted with a user-operated band saw. Various band saws useful for cutting tissue and bone and as will be recognized by one of skill in the art may be provided. Band saws of the present invention may be stationary or floor-mounted band saws or may be portable bandsaws of the pneumatic, electric, or hydraulic variety.

Subsequent to splitting and washing operations, carcasses are conveyed to a cooling station 26 further contained within the trailer 21. In various embodiments, trailer 21 may be docked or connected to additional features and structures. In the embodiment shown in FIG. 1, for example, the trailer 21 is docked to a structure 28 comprising cooling capabilities and a carcass quartering area, for example. Structure 28 thus houses various meat processing operations. Processed carcasses and product may be routed from structure 28 to, for example, additional trailers 32, 34. In one embodiment, at least one of additional trailers 32, 34 comprise non-modified trailers for carcass cooling, storage, and/or transport. These trailers 32, 34 may comprise one or more electric air conditioning or cooling units 36. Although the embodiment of FIG. 1 depicts two trailers 32, 34 docked to the structure 28, it will be expressly recognized that the present invention is not so limited. It is contemplated that any number of trailers may be docked to a structure 28. One or more transport trailers 30 may also be docked to the structure 28 for receiving and transporting processed meat and animal products.

Figure 2:
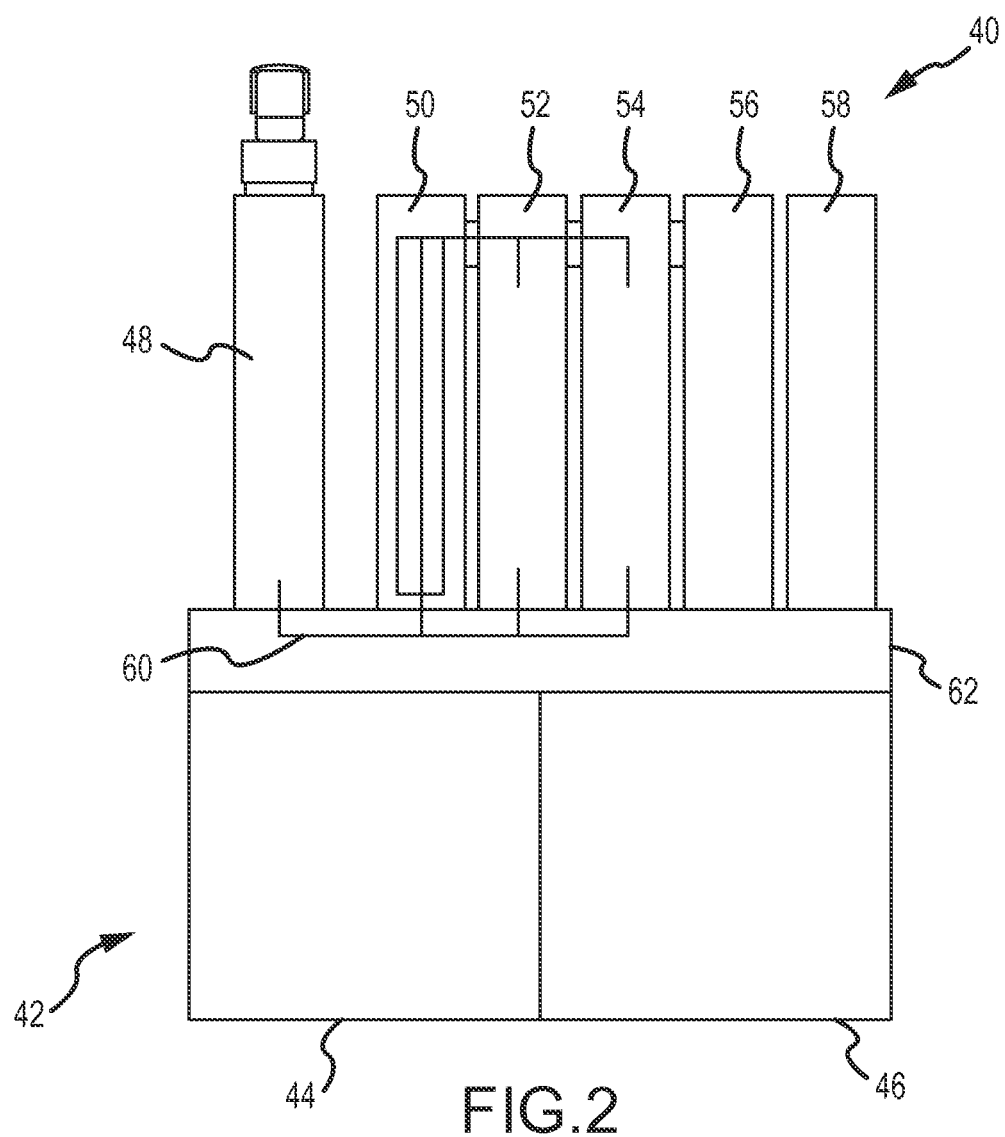
FIG. 2 is a schematic of a mobile slaughtering and meat processing system according to one embodiment.

FIG. 2 is an elevation view of a processing facility in accordance with one embodiment of the present disclosure. A modular cut-wrap facility 40 is provided comprising a standalone structure 42 having a flexible area 44 and a retail market space 46. Flexible area 44 may be designated for any number of operations including, for example, cooling, shipping, dry storage, kitchens, restrooms, and/or office space. A retail market space 46 may further be provided adjacent or proximal to such an area 44. The cut-wrap facility 40 further comprises modular units in various embodiments, including, for example, a carcass aging and holding cooler 50, a processing or packaging facility for a first product 52 (e.g. beef), a processing or packaging facility for a second product 54 (e.g. pork), a freezer unit 56, and a curing and smoking facility 58. Modular units 52, 54, 56, 58 comprise converted or modified trailer units. A rail system 60 is provided to convey product to and from one or more units or stations. The rail system is conveyed through a refrigerated dock area 62 to preserve freshness of product, even when in transit. It is known that many towns, including rural towns, have vacant buildings that may be available to be modified into value-added facilities, including facilities as shown and described herein. For example, a transport unit 48 comprising animals or meat product for further processing may be interconnected to the system 40. The embodiment of FIG. 2 provides one such value-added facility including mobile meat processing features, methods, and devices of the present disclosure.

Figure 3:
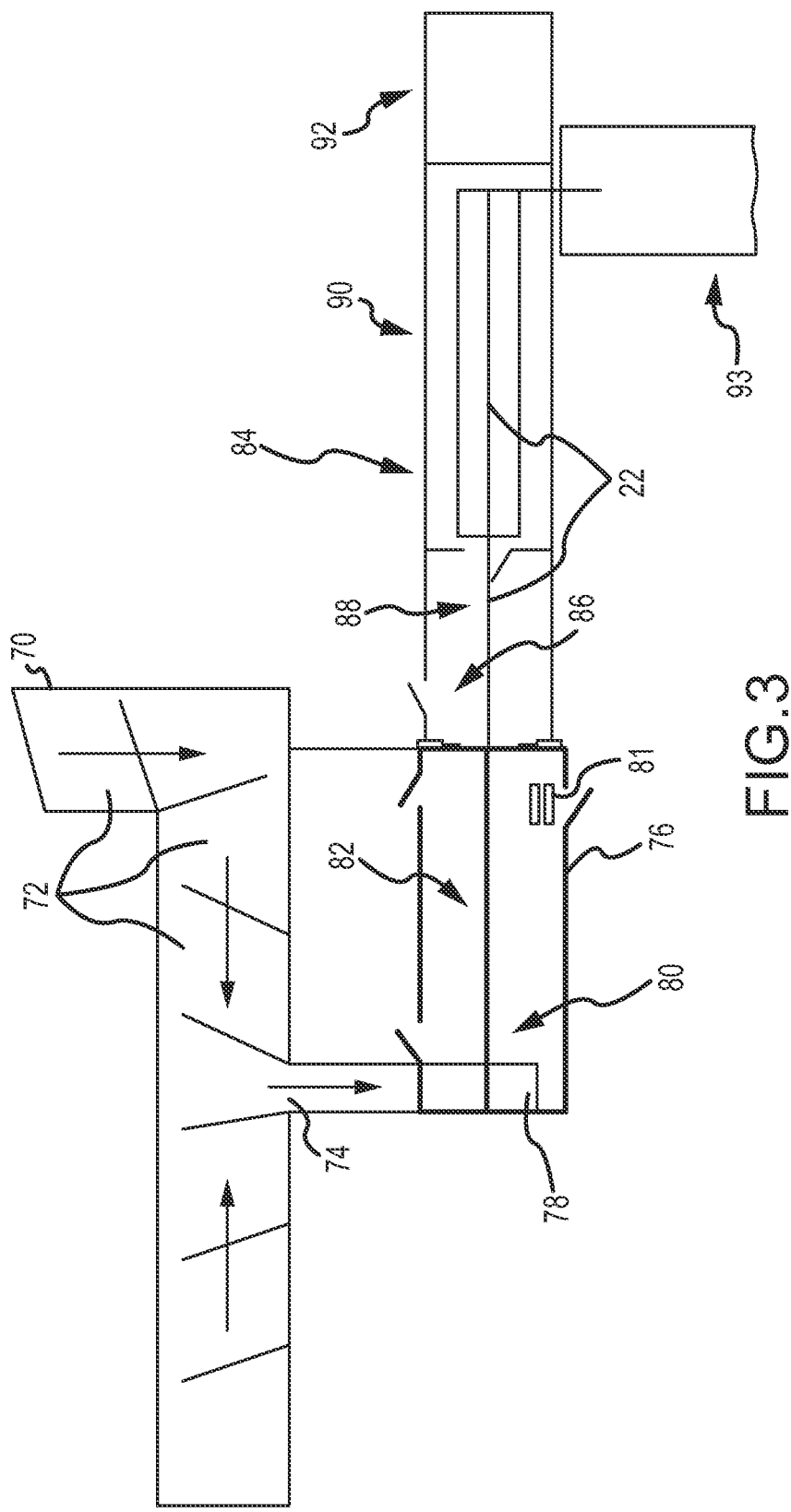
FIG. 3 is a schematic of a mobile slaughtering and meat processing system according to one embodiment.

FIG. 3 is a top plan view of a mobile meat processing facility according to one embodiment of the present disclosure. As shown, a livestock handling area 70 is provided proximal mobile abattoir facilities 76, 84. The livestock handling area as shown comprises heavy duty portable corral panels that are selectively interconnectable and arranged to lead livestock to processing facilities. Livestock can be worked from any number of directions. In a preferred embodiment, a plurality of sections 72 are provided within the corral system 70. Sections 72 comprise, for example, 10'×10' sections wherein adjacent sections are partially divided by alternating gates or corrals such livestock can move from one adjacent panel to the next. A kill alley 74 is provided as a point of ingress into a "kill box" 78 structure contained within a larger "kill trailer" 76. The kill box 78 structure comprises a relatively confined space with appropriate constraints for stunning and/or killing an animal. Provided within the kill trailer 76 are additional stations for bleeding 80 and skinning of animals 81. An I-beam trolley rail 82 is provided, the rail 82 extending generally along or through stations for conducting specific operations. The rail 82 is constructed of sufficient size and strength to accommodate a plurality of animals to be processed (e.g. bovine, swine, etc.). Hide removal area 81 preferably comprises a hidepuller unit for skinning an animal and at least one point of egress through which removed hides are conveyed.

A mobile meat processing unit 84 is provided adjacent or proximal to the kill trailer 76. As shown in FIG. 3, the mobile unit 84 comprises a modified 53' trailer unit. The mobile meat processing unit comprises an evisceration area 86, a split, wash, and rinse area 88, and a cooler unit 90. Animals are conveyed between these dedicated areas by an overhead rail system 22. A portion of the trailer 84 may be dedicated as a mechanical area 92 for components including, by way of example, generators, chillers, water treatment facilities, etc. An additional mobile unit, such as a 48' chilled transport "reefer" container unit 93 may be provided proximal to the mobile unit 84. The reefer unit 93, in one embodiment, comprises a unit capable of storing at least approximately 50 head of cattle for refrigerated storage and/or transport.

In various embodiments, the kill trailer and/or the mobile meat processing unit are provided with stabilizer feet proximal one or more corners of the unit(s). Hydraulics are provided in various embodiments to power the stabilizer feet, slide and swing gates. Controls are managed by a "knocker" or other operator. Such features and advantages of the present disclosure eliminate or at least reduce the need for a hoist to lift animals into the kill trailer or mobile meat processing unit.

Figure 4:
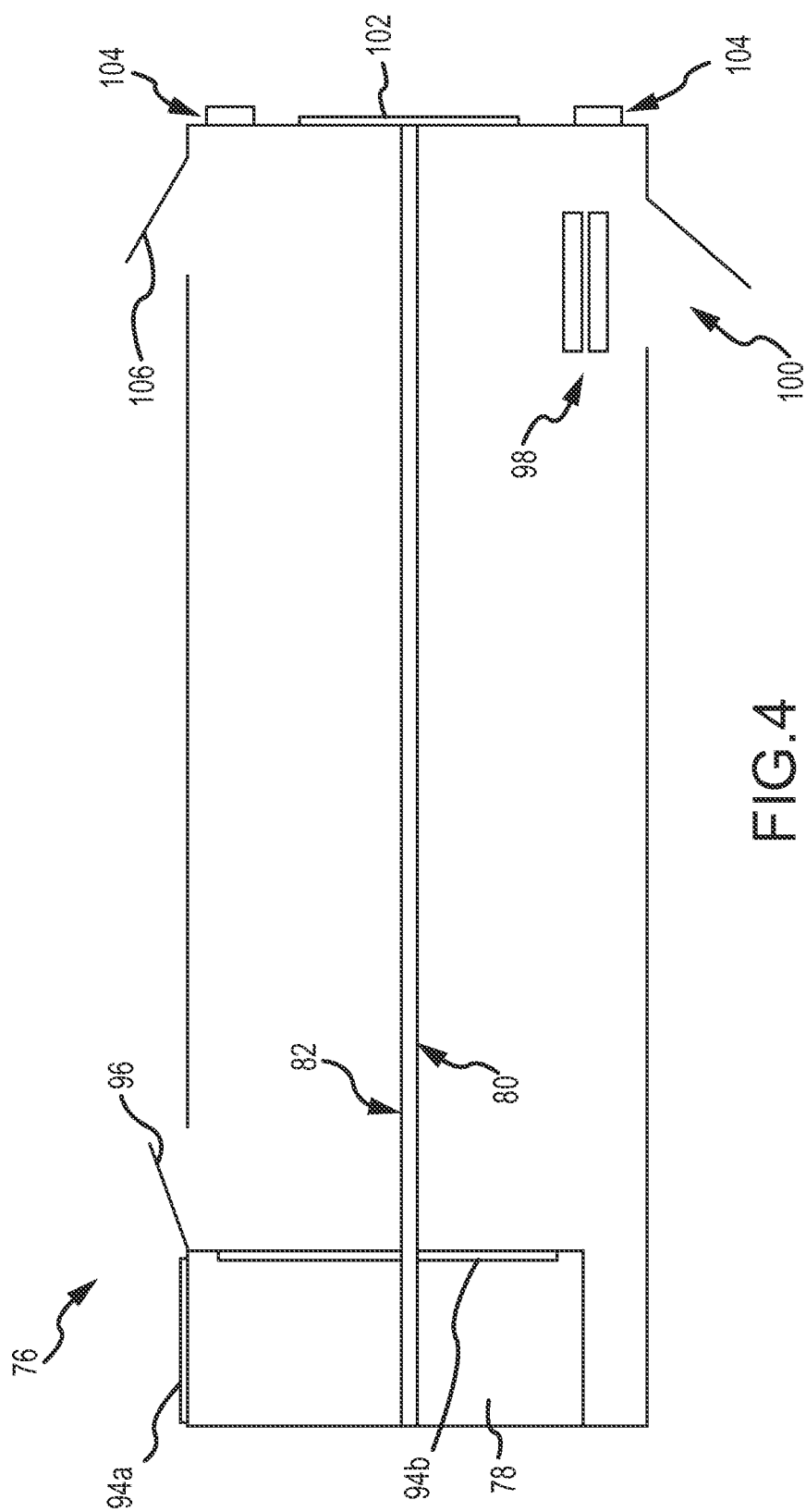
FIG. 4 is a top plan view of a component of a mobile slaughtering and meat processing system according to one embodiment.

FIG. 4 is a detailed plan view of the kill trailer 76 of FIG. 3. As shown, a kill box 78 is provided into livestock is conveyed. The kill box, which comprises lift gates 94a, 94b for ingress of live animals and egress of slaughtered animals, comprises a width of approximately 32" in a preferred embodiment. The kill box 78 comprises means for humane slaughter of animals, such humane means being recognized by one of skill in the art. For example, it is known that stunning an animal correctly will provide better meat quality, whereas improper stunning will cause bloodspots in the meat, bone fractures, and stress and/or pain in the animal. Good stunning practices are also required so that a plant will be in compliance with the Humane Slaughter Act and for animal welfare. When stunning is done correctly, the animal feels no pain and it becomes instantly unconscious. An animal that is stunned properly will produce a still carcass that is safe for plant workers to work on.

In one embodiment, the kill trailer 76 comprises a modified flat-bed steel deck utility trailer, thereby eliminating the need for a tractor/loader to lift animals and allowing animals to walk up an inclined ramp and generally reducing stress levels of the animal and safety hazards to users or nearby workers.

In preferred embodiments, a kill box 78 is disposed generally perpendicular to a length or longitudinal axis of the trailer 76. Animals thus enter from the side, or perpendicular to a lengthwise dimension of the trailer 76, and are subsequently killed with a captive bolt gun in the back of the head from above. This arrangement provides for an efficient, painless, and stress-free form of slaughter for the animal, thereby increasing safety and meat quality. A platform or walkway for a user is provided proximal to the kill box 78. Subsequent to knocking, or killing, the animal is fully landed on the rail system 82 prior to entering the mobile processing unit 84. A cross-gate 94b is provided on the kill box 78 for releasing an animal after knocking, whereupon the animal is hoisted for bleeding. In preferred embodiments, the kill trailer 76 comprises one or more floor drains for receiving blood. A pump system is further provided to transport blood and liquids into a larger holding container.

At least one door 96, 100, 106 for ingress and egress of human users is provided. While doors may provided in any number of locations, it will be recognized that the point ingress and egress for humans should be generally provided in a safe location such that users are not introduced to excessive or unnecessary danger upon entering or exiting the kill trailer 76.

An I-beam 82 is provided along which killed animals may be conveyed. A lowermost portion of the I-beam 82 is preferably positioned between 12 and 20 feet above a trailer floor surface. In one embodiment, a lowermost portion of the I-beam 82 is provided approximately 16 feet above a trailer floor surface. It is contemplated that a 1,250 lb. slaughter steer will require approximately 13 feet of vertical working height from nose to hind hoof in order for various operations to be performed. For smaller stock, different heights may be provided. The present disclosure, however, contemplates a working height of at least approximately 13 feet and more preferably of approximately 16 feet. Although in various embodiments an I-beam structure is contemplated for supporting the weight of one or more animals to be processed, various alternative support structures are within the scope and spirit of the present disclosure. Various overhead conveyance racks and systems suitable for supporting the weight of at least one animal are contemplated and the present disclosure is not limited to any particular structure.

The kill trailer unit 76 comprising the kill box 78 further comprises a bleeding and landing area 80 and a hide puller 98. A drop-out door 100 is provided generally proximal to a hide puller unit or station 98 such that hides may be removed from the trailer 76 in a safe and efficient manner without risking contamination to additional objects, stations, or features.

The kill trailer 76 is further selectively connected to a mobile abattoir trailer unit, as shown in FIG. 3. In various embodiments, the kill unit 76 comprises a door 102 of approximately 42 inches in width which is selectively openable for interconnection with a mobile meat processing unit 84. The kill trailer 76 and/or the mobile meat processing unit 84 comprise dock cushions 104 for guiding and facilitating the appropriate interconnection or spatial relationship between the units.

Figure 5:
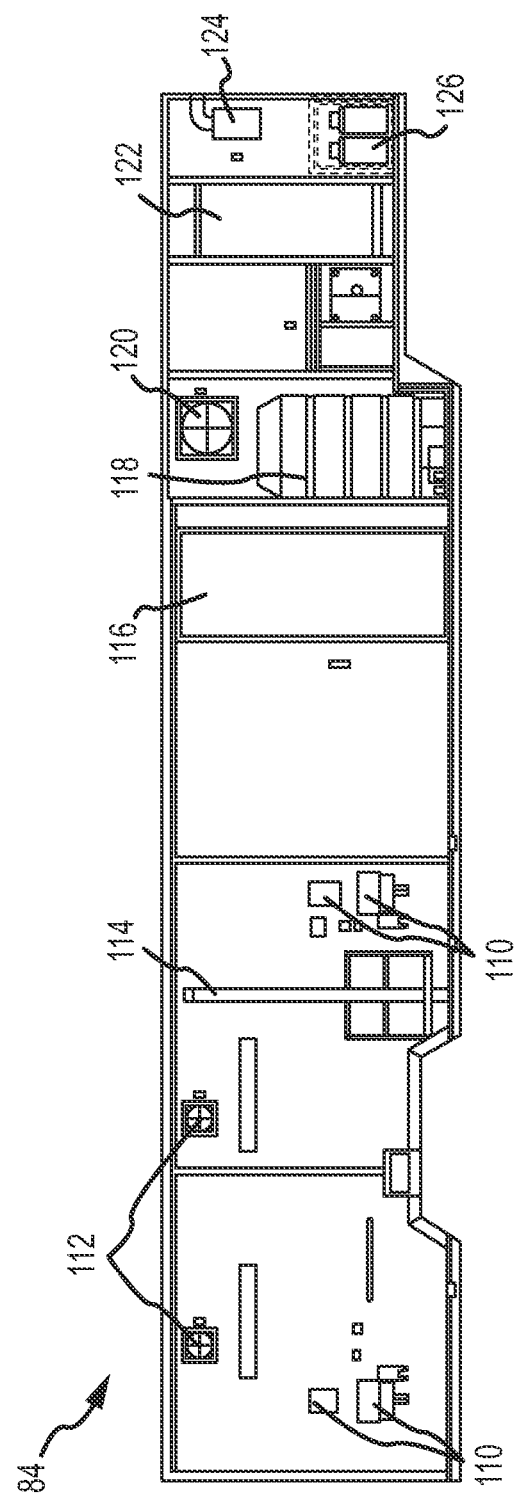
FIG. 5 is a side elevation view of a component of a mobile slaughtering and meat processing system according to one embodiment.
Figure 6:
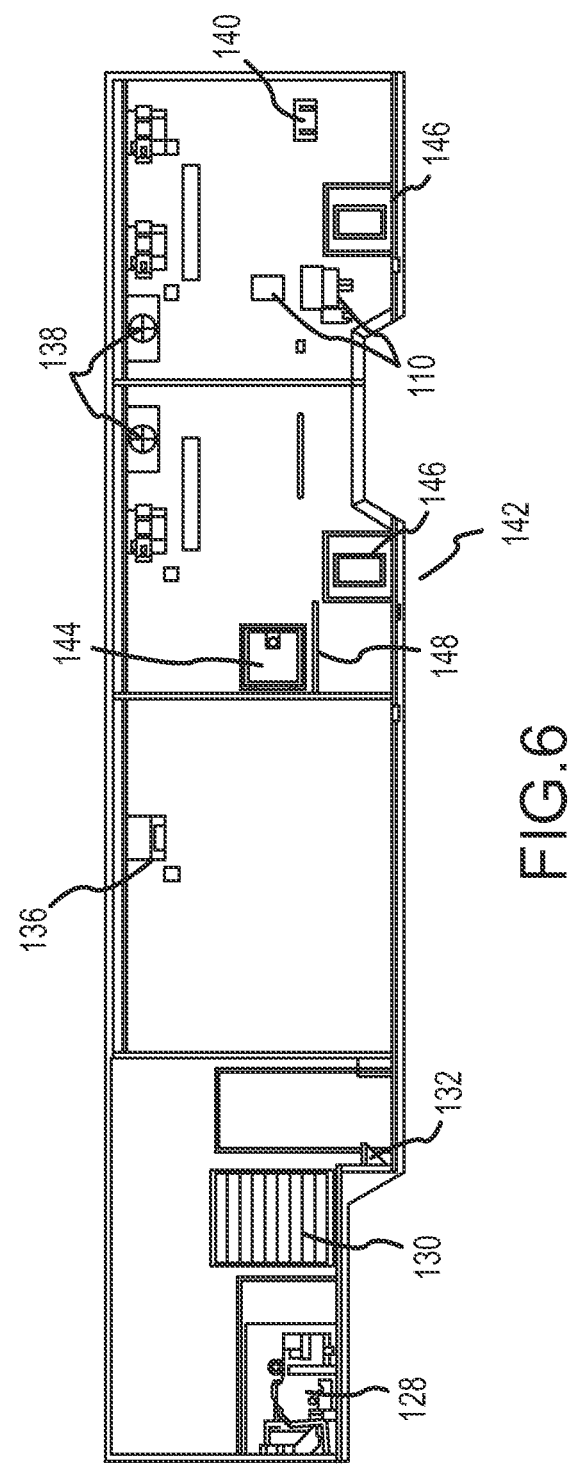
FIG. 6 is a side elevation view of a component of a mobile slaughtering and meat processing system according to one embodiment.

FIGS. 5-6 provide various elevation views of a trailer unit for use in a mobile abattoir unit according to one embodiment. While various features and dimensions of the trailer unit are provided in FIGS. 5-6, it will be expressly understood that the present invention is not limited to such features and/or dimensions. Indeed, trailer units provided with various modifications to accommodate various needs of mobile abattoir facilities are within the scope and spirit of the invention.

FIG. 5 is a cross-sectional elevation view of a mobile meat processing unit 84 according to one embodiment of the present disclosure. As shown, the unit 84 comprises a preexisting trailer structure that has been modified or adapted in various ways to suit the needs and demands of animal slaughtering and meat processing operations. The unit 84 is provided with a number of internal features contained within a trailer structure, such as a 53 foot long cargo trailer unit, to meet the needs of human users and animals to be processed. FIGS. 5-6 are provided for exemplary purposes and show features of various embodiments. It will be expressly recognized that kill trailers and mobile meat processing units of the present disclosure are not limited to the arrangements provided in FIGS. 5-6, or even any one particular feature as shown and described herein.

FIG. 5 depicts a trailer 84 comprising sanity features such at least one washing station for human users 110, which may comprise a standard-sized knee operated sink and related features, such as soap and towel dispensing units; air circulation means 112, 120, which may comprise a motorized and insulated louver with a 12 inch or 24 inch exhaust/intake fan; a hydraulic elevating platform 114; at least one user entry/exit point 116; water storage means 118, such as a polypropylene water tank provided on a riser; an emergency eye-rinse and/or shower module 122; a water heater unit 124; and gas storage 126, such as one or more propane tanks.

FIG. 6 depicts a trailer 84 as viewed from the opposite as in FIG. 5. Features of FIG. 6 should not be read or construed as being provided in place of any features of FIG. 5. Indeed features shown in FIGS. 5-6 may be provided in combination or in lieu of each other. The embodiment provided in FIG. 6 discloses a generator unit 128 provided within an enclosure for powering various trailer operations. The generator unit 128 may be, for example, a Kohler 30EORZD 30 kW diesel generator. A motorized and insulation louver 130 is provided for venting generator fumes. Generator 128 and related systems may be at least partially isolated from additional trailer areas, such as by virtue of being elevated and having a step-up 132 provided. A mount 136 for a hide-pulling winch is provided in an upper or ceiling region of the trailer. AC evaporators 138 are further provided in an upper region of the trailer. An inspector's station 142 is provided within the trailer, the inspector's station comprising a locker unit 144, a flip-down inspection table 148, and at least one portal 146 for removing undesired materials from the interior of the trailer 84. A head inspector loop holer 140 is further provided in or proximal to the inspector's station 142.

The present disclosure contemplates an ozonation system for water used in connection with mobile meat processing operations. Such contemplated systems and features are particularly desirable in applications where the only available sources of water may be, for example, natural sources such as wells which do not necessarily comply with various requirements for use in meat processing. Various complications and short-comings associated with establishing mobile meat processing operations, including the general lack of clean, reliable water sources are obviated by features of the present disclosure wherein one or more ozonation, filtration, and water circulation systems are provided.

Figure 7:
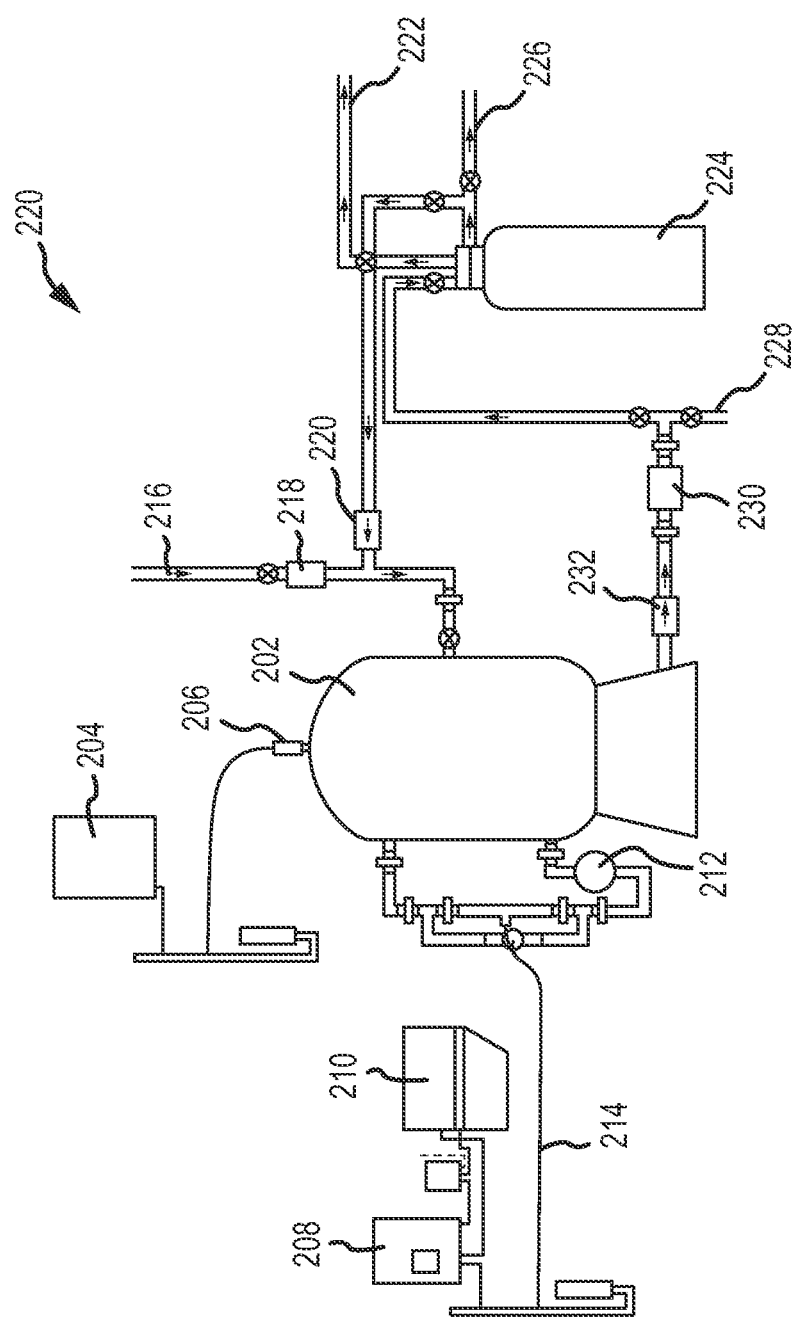
FIG. 7 is a schematic of a water treatment system according to one embodiment.

FIG. 7 is a schematic of a mobile abattoir water treatment system 200 according to one embodiment of the present disclosure. As shown, a holding tank 202 is provided for storing source water and/or oxygenated water. Water from a source, such as well water or water from a municipal source is conveyed to the tank 202 which is subsequently recirculated via one or more pumps 212, 230 to and from ozonation features including an ozone generator 208 and an oxygen concentrator 210. Water stored within the holding tank 202 may be selectively conveyed from the tank 202 by one or more check valves 218, 220, 232, and pumps 212, 230. Conveyed water from the tank 202 may be directed through one or more filters 224 from where the water is then conveyed to to: the holding tank 202 (e.g. for further ozonation), to a disposal site via outlet 222, or to abattoir components via return line 226 for use in meat processing operations.

Various features and embodiments as shown and described herein provide numerous advantages over the prior art. For example, features and embodiments of the present disclosure provide for waste products (roughly 40% of the carcass weight) to be removed prior to hauling, thereby greatly improving transportation efficiency. Further, the present disclosure allows farmers, ranchers, and those most closely connected with the livestock to remove and sell the hides themselves, providing an additional economic value of $40 or more to the return from each animal.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A mobile abattoir system comprising:
   an animal containment enclosure adapted to house a plurality of animals and generally defining a flow path for the plurality of animals;
   the flow path selectively interconnectable to a mobile abattoir unit;
   the mobile abattoir unit comprising:
      an enclosure for receiving, securing, and knocking a single animal;
      an overhead conveyor for receiving and conveying an animal carcass produced by knocking;
      a hide puller unit for removing at least a portion of a hide of the carcass, and a point of egress from the mobile abattoir unit for a removed hide, located proximal to the hide puller;
   the mobile abattoir unit selectively connected to a second mobile facility, the second mobile facility comprising at least one of: refrigerated storage, a cutting station, an evisceration station, a wash station, an overhead conveyor, and a water purification unit.

2. The mobile abattoir system of claim 1, wherein a water treatment system is provided comprising a water storage unit and ozone means for subjecting one or more sources of water to ozone.

3. The mobile abattoir system of claim 1, wherein the mobile abattoir unit and at least the second mobile facility house at least one of the operations of: stunning, knocking, bleeding, hide pulling, evisceration, splitting of an animal, electrical stimulation, tenderizing, refrigeration and freezing.

4. The mobile abattoir system of claim 3, wherein each of the operations of stunning, hide pulling, evisceration, splitting of an animal, electrical stimulation, and refrigeration are segregated into separate mobile and interconnectable facilities.

5. The mobile abattoir system of claim 1, wherein the animal containment enclosure comprises a plurality of selectively interconnected corral sections.

6. The mobile abattoir system of claim 1, wherein the hide puller unit comprises a winch system for processing a slaughtered animal into a skinless carcass.

7. The mobile abattoir system of claim 1, wherein electrical power is provided to the system through at least one of a gas-powered generator, a pre-existing source of alternating current, and a pre-existing reefer unit.

8. The mobile abattoir system of claim 1, further comprising a mobile refrigerated unit selectively connected to the second mobile facility, the mobile refrigerated unit adapted for at least one of receiving, storing, refrigerating, and transporting carcasses from the second mobile facility.

9. The mobile abattoir system of claim 1, wherein at least one of the mobile abattoir unit and the second mobile facility comprises means for towing.

10. A system for deriving meat product from animals, comprising:
   an animal guide comprising a plurality of interconnected corral sections and a plurality of gates for containing and guiding animals, the animal guide comprising an entry region for receiving and housing a plurality of animals and an exit portion comprising a single file chute;
   the exit portion leading to a first mobile structure comprising an enclosure for receiving and knocking an animal;
   an overhead conveyor for supporting carcasses in a vertical orientation, and translating carcasses between at least two of the operations of bleeding, hide-removal, cleaning, drying, cutting, splitting, refrigerating, and storing;
   a second mobile structure comprising a refrigerator unit for preserving carcasses; and
   a third mobile structure for receiving at least portions of carcasses from the second mobile structure and transporting the at least portions of carcasses from the system.

11. The system of claim 10, wherein a water treatment system is provided comprising a water storage unit and ozone means for subjecting one or more sources of water to ozone.

12. The system of claim 10, wherein the first mobile structure houses at least one of the operations of: stunning, knocking, bleeding, hide pulling, evisceration, splitting of an animal and electrical stimulation of a carcass.

13. The mobile abattoir system of claim 12, wherein each of the operations of stunning, hide pulling, evisceration, splitting of an animal, electrical stimulation, and refrigeration are segregated into separate mobile and interconnectable facilities.

14. The system of claim 10, wherein electrical power is provided to the system through at least one of a gas-powered generator, a pre-existing source of alternating current, and a pre-existing reefer unit.

15. The system of claim 10, wherein the third mobile structure is a refrigerated unit selectively connected to the second mobile structure, the refrigerated unit adapted for at least one of receiving, storing, refrigerating, electrically stimulating and transporting carcasses from the second mobile facility.

16. The system of claim 10, wherein at least one of the first and second mobile units comprise means for towing.

17. The system of claim 10, wherein the means for towing comprise a plurality of wheels and a trailer coupler.

18. The system of claim 10, wherein the first, second, and third mobile structures comprise towing means.

19. The system of claim 10, wherein at least one of the operations of bleeding and hide-removal is performed in the first mobile structure and at least one of the operations of cleaning, drying, cutting, and splitting is performed in the second mobile structure.

20. A mobile abattoir system comprising:
   an animal containment enclosure adapted to house a plurality of animals and generally defining a flow path for the plurality of animals;
   the flow path selectively interconnectable to a mobile abattoir unit;
   the mobile abattoir unit comprising:
      an enclosure for receiving, securing, and knocking a single animal;
      an overhead conveyor for receiving and conveying an animal carcass produced by knocking;
      a hide puller unit for removing at least a portion of a hide of the carcass, and a point of egress from the mobile abattoir unit for a removed hide, located proximal to the hide puller;
   the mobile abattoir unit selectively connected to a plurality of additional mobile units, at least one of the plurality of additional mobile units performing at least one operation selected from the group consisting of: refrigeration, dehairing, evisceration, cutting, bleeding, hide-removal, cleaning, drying, splitting, storing, transporting, curing, smoking, and wrapping.

* * * * *